United States Patent [19]

Hsiao

[11] Patent Number: 4,798,225

[45] Date of Patent: Jan. 17, 1989

[54] SEPERABLE VALVE ASSEMBLY INCLUDING A VALVE MOUNT AND A VALVE BODY

[76] Inventor: Hsin I. Hsiao, No. 120-1, Shin-Rong Road, Chiayi City, Taiwan

[21] Appl. No.: 99,340

[22] Filed: Sep. 18, 1987

[51] Int. Cl.⁴ .............................................. F16K 51/00
[52] U.S. Cl. .................................................. 137/454.2
[58] Field of Search ................... 137/315, 454.2, 454.6

[56] References Cited

U.S. PATENT DOCUMENTS

| | | | |
|---|---|---|---|
| 860,217 | 7/1907 | Jackson | 137/454.6 |
| 3,250,291 | 5/1966 | Roy | 137/454.6 |
| 3,658,087 | 4/1972 | Nelson | 137/454.6 |

Primary Examiner—Robert G. Nilson
Attorney, Agent, or Firm—Browdy and Neimark

[57] ABSTRACT

A seperable valve assembly has a valve mount as well as a valve body, which can be readily be put together for use and instantly taken apart for replacement of either of the two. The valve mount is in the form of a concavity having two inclined wall planes and an arcuate bottom surface, in conformity with the shape of the valve body, so that the valve body can be tightly and fitly wedged thereinto in assembly. The valve body is secured in place by a number of bolts and nuts, with a sealing element disposed between the contact surfaces for leakage-preventing purpose. A valve body lifting bolt is disposed at the bottom of the mount for facility of seperating the valve body from the assembly.

3 Claims, 1 Drawing Sheet

SEPERABLE VALVE ASSEMBLY INCLUDING A VALVE MOUNT AND A VALVE BODY

SUMMARY OF THE INVENTION

The present invention relates to a valve assembly mainly consisting of a valve mount and a valve body that are easily put together and quickly separated from each other for repair or replacement, and the valve mount has a concavity with smooth inner wedge-shaped surface which is contoured precisely in conformity with the shape of the valve body so that the two can be tightly fitted with respect to each other in assembly.

Valves have been widely employed in pipeline systems at power plants to conditionally control the flow of steam, gas and fluid or to regulate the fluid pressure in the pipes.

A variety of valves have been designed and are available in industry, such as lift valves, butterfly valves, gate valves, rotary valves; and in more functional term, the valves can be further categorized into stop valves, throttle valves, escape valves, emergency valves, distributing valves, check valves and reducing valve.

Valves are easily worn out and become leaky in operation, causing loss of material or danger to the operational safety, and therefore the replacement of these broken valves is indispensible must be carried out occasionally. However the replacement of a valve involves a number of complicated steps in which welding, cutting and threading exercises must be performed.

There are two methods of connection of a valve to a pipeline, i.e., threads connecting as well as flange connecting methods; the disadvantages of the two approaches in replacing a broken valves are listed as below:

1. The threads connecting method, as shown in FIG. 1, is practiced by first putting threads on the external surface of the two ends of tubes, and the valve is then jointed to the ends of the tubes in assembly. But here the worn out valve is hard to be detached from the tubes when all the tubes and valves are fixed in place, and the only way to effect the removal is carried out by cutting them apart. A new valve must be recoupled to the tubes by using a connecting member. This kind of approach makes the replacement of a valve time, labor and material consuming.

2. In the flange connecting method, as shown in FIG. 2, the valve is bolted to a pair of flange members to which tubes are first welded first. However, the valve is fitly inserted (fits tightly) between the two flange members in the assembly, and the removal of the valve must be performed by properly bending the tubes. The bent tubes are difficult to get straight after the replacement of the valve, causing inconvenience and imperfection in a valve replacement practice.

To better disclose the structure and operation mode of the valve assembly of the present invention, a number of drawings are presented in accompaniment with the following detailed description of the preferred embodiment of the present valve structure, in which:

DETAILED DESCRIPTION OF THE PREFERRED EMBODIMENT

Figure 1:
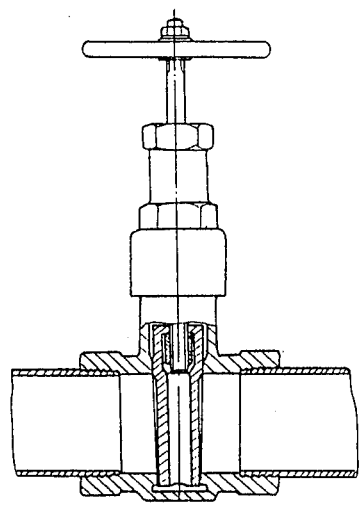
FIG. 1 is a conventional valve jointed to the associated tubes by threads.
Figure 3A:
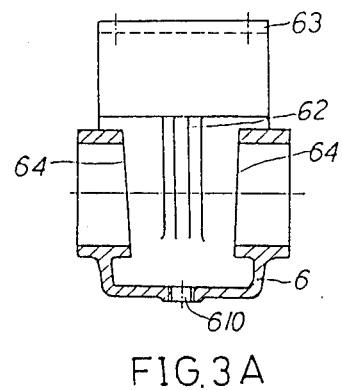
FIG. 3A is an axial sectional view of the present valve mount.
Figure 2:
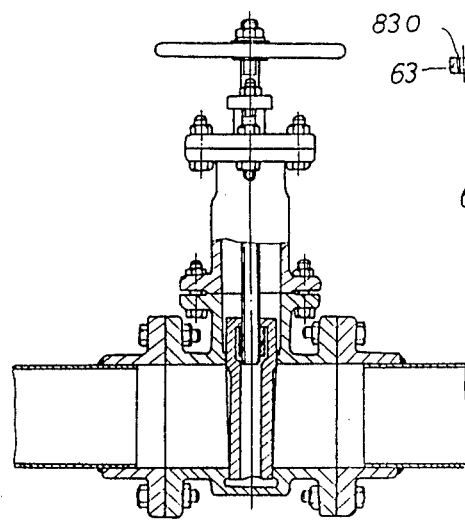
FIG. 2 is a conventional valve jointed to the associated tubes by flange members.
Figure 3B:
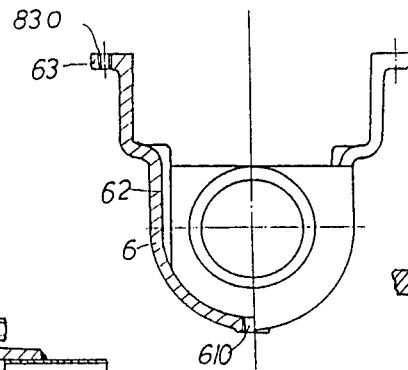
FIG. 3B is a lateral sectional view of the present separated valve mount.

With reference to FIG. 3A and FIG. 3B, a valve mount 6 is formed to have a concavity with a tube-connecting port disposed at each side thereof; and external tubes are joined to said ports by welding. The two inner surfaces 64 of said concavity of the valve mount 6 are contoured to have two opposite inclined planes, so that a valve body 7 having correspondingly shaped external planes can be tightly wedged into said cavity. At the center of the bottom of the cavity, there is disposed an inner threaded bolt hole 610 into which a valve body lifting bolt 61 is located. On the top rim of the wall of said cavity is disposed an outward horizontally extended flange 63 on which are disposed a number of bores 830. On both the other opposing inner walls of said cavity, there is disposed a groove-like track 62.

Figure 5:
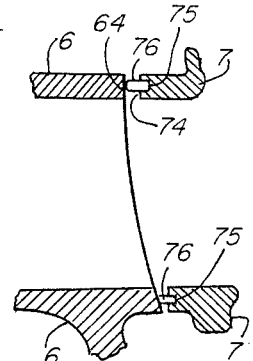
FIG. 5 shows a part of an axial sectional view, indicating an O-ring type seal between respective parts of the valve mount and the valve body.
Figure 4A:
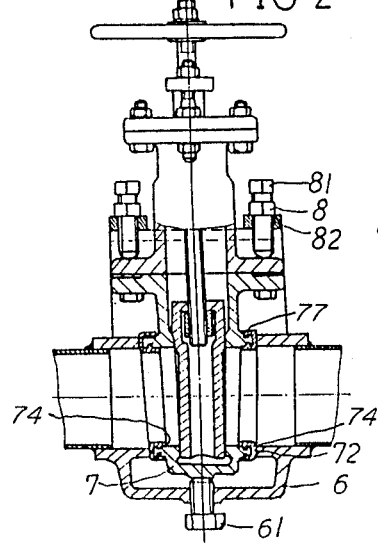
FIG. 4A is an axial sectional view of the present valve assembly.
Figure 4B:
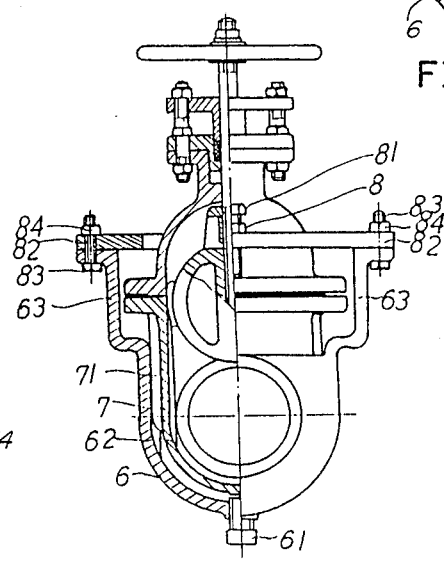
FIG. 4B is a lateral sectional view of the present valve assembly.

With reference to FIG. 4A, FIG. 4B, on each side of valve body 7, corresponding to the said groove-like track 62, there is provided a vertical protrusion 71 in registry with said track 62 in assembly. The other two sides of said valve body 7 comprise surfaces 74 which are shaped in conformity with said inclined planes 64, for facilitating a wedging association with respect to said concavity of said valve mount 6 in assembly. A pair of circular recesses or grooves 75 can be disposed along the respective peripheries of the two surfaces 74 of said valve body 7 opposing the respective surfaces 64 of the valve mount for receiving O-shaped sealing rings 76 therein, for leakage preventing purposes, as indicated in FIG. 5. Alternatively, as indicated in FIG. 4A, another kind of circular sealing elements 72 with respective groove means 77 on both sides of each surface 74 can be adopted to effect the same purpose as indicated in FIG. 4A.

On said outward extended flange 63 are mounted a pair of fixing boards 82, secured in place by sets of bolts 83 and nuts 84. At the center of each said fixing board 82 is disposed a threaded bore for location of a valve body pushing bolt 81, having a nut 8 attached therewith, for use in actuating said valve body 7 to move downward. Thus a tight fitting is provided when said valve body 7 is engaged with said valve mount 6, with said vertical protrusion 71 of said valve body 7 in sliding registry with respect to said groove-like track 62 of said valve mount 6. Thus surfaces 64 and 74 of said valve mount 6 and valve body 7 respectively are tightly fitted with respect to each other.

In detachment of said valve body 7 from said valve mount 6, said nuts are first loosened so that said fixing boards 82 are able to be removed therefrom, then the valve body lifting bolt 61 is actuated to push upward the valve body 7. The present example is based on a gate valve structure; however, other types of valve, such as lift valves, butterfly valves, and rotary valves are all suitable for the present invention, as long as the inlet and outlet ports of the valve are disposed rectilinearly.

It is clearly seen that the present valve structure is characterized in its ready, quick attachment to and detachment from a pipeline system by adoption of a combination of separable valve mount and valve body. Thus, replacement of a broken valve on a pipeling is greatly simplified.

What is claimed is:

1. A separable valve assembly comprising;
 a valve mount and a valve body, wherein said valve mount is structured in a concavity form defining two inclined inner planes oppositely disposed therein, each said inclined inner plane including a respective inclined surface part of said valve mount, and said valve body has two inclined surface parts defining two correspondingly contoured external planes of said valve body, said two inclined external planes of said valve body being in registry with said two inclined inner planes of said valve mount, such that said valve body can be fitly wedged into said concavity of said valve mount,
 a pair of fixing boards removably mounted on the top of said valve mount, with a valve body pushing bolt provided at the center of each said fixing board, each said valve body pushing bolt being used to push said valve body into tight engagement with said valve mount in assembly;
 groove means on said valve body in the vicinity of said surface parts thereof;
 sealing elements provided in said groove means for preventing leakage between said inclined surface parts of said valve body and said inclined surface parts of said valve mount in assembly; and
 a valve-body lifting bolt placed at the bottom of said valve mount to abut against the bottom of said valve body, for pushing said valve body upward for separation of the two for disassembly when said valve-body lifting bolt is rotated to progress upward.

2. The assembly of claim 1, comprising:
 two further oppositely disposed planes in said valve mount and defining said concavity form, said two further planes having track-like grooves therein; and
 vertical protrusions on either side of said valve body in registry with said track-like grooves in assembly.

3. The assembly of claim 1, comprising:
 a sliding gate in said valve body, and
 means for moving said sliding gate in a direction parallel to the pushing of said valve body for said tight engagement and said disassembly, for opening and closing the valve.

* * * * *